(12) United States Patent
Heinebrodt et al.

(10) Patent No.: US 10,567,109 B2
(45) Date of Patent: Feb. 18, 2020

(54) METHOD FOR SERIALLY TRANSMITTING A FRAME FROM A TRANSMITTER TO AT LEAST ONE RECEIVER BY MEANS OF A BUS SYSTEM, AND A SUBSCRIBER STATION FOR A BUS SYSTEM

(71) Applicant: Robert Bosch GmbH, Stuttgart (DE)

(72) Inventors: Martin Heinebrodt, Stuttgart (DE); Christian Horst, Dusslingen (DE); Peter Svejkovsky, Renningen (DE); Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 15/508,242

(22) PCT Filed: Aug. 4, 2015

(86) PCT No.: PCT/EP2015/067928
§ 371 (c)(1),
(2) Date: Mar. 2, 2017

(87) PCT Pub. No.: WO2016/034349
PCT Pub. Date: Mar. 10, 2016

(65) Prior Publication Data
US 2017/0288807 A1 Oct. 5, 2017

(30) Foreign Application Priority Data

Sep. 2, 2014 (DE) .......... 10 2014 217 508
May 20, 2015 (DE) .......... 10 2015 209 207

(51) Int. Cl.
*H04L 1/00* (2006.01)
*H04L 12/40* (2006.01)

(52) U.S. Cl.
CPC .......... *H04L 1/0008* (2013.01); *H04L 1/0011* (2013.01); *H04L 1/0041* (2013.01);
(Continued)

(58) Field of Classification Search
CPC ... H04L 1/0008; H04L 1/0011; H04L 1/0041; H04L 1/0045; H04L 1/0061;
(Continued)

(56) References Cited

U.S. PATENT DOCUMENTS 5,062,105 A * 10/1991 McKnight ............. H04J 3/1629
370/538
6,292,484 B1 * 9/2001 Oliver ..................... H04L 12/64
370/389

(Continued)

OTHER PUBLICATIONS

International Search Report corresponding to PCT Application No. PCT/EP2015/067928, dated Nov. 25, 2015 (German and English language document) (5 pages).

(Continued)

*Primary Examiner* — Kyle Vallecillo
(74) *Attorney, Agent, or Firm* — Maginot, Moore & Beck LLP (57) ABSTRACT

The disclosure relates to a method for serially transmitting a frame from a transmitter to at least one receiver by means of a bus line, as well as a subscriber station for a bus system. According to said method, stuff bits are inserted into the frame by the transmitter according to a predetermined rule in order to generate additional signal edges, and/or said stuff bits are removed again by the receiver when evaluating the frame, at least one item of information relating to a subsection of the frame additionally being added, and transmitted, outside of this subsection, and said subsection containing a predetermined sequence of bit values.

10 Claims, 3 Drawing Sheets

(52) U.S. Cl.
CPC ............ *H04L 1/0061* (2013.01); *H04L 12/40* (2013.01); *H04L 2012/40215* (2013.01)

(58) Field of Classification Search
CPC ..... H04L 1/0083; H04L 1/009; H04L 1/0091; H04L 12/40; H04L 12/40013; H04L 12/4135; H04L 2001/0094; H04L 2012/40208; H04L 2012/40215; H04L 2012/40273
See application file for complete search history.

(56) References Cited

U.S. PATENT DOCUMENTS

| | | | |
|---|---|---|---|
| 6,587,527 B1 * | 7/2003 | Tani | H04J 3/0608 370/509 |
| 2003/0058882 A1 * | 3/2003 | Fleury | H04L 12/40026 370/445 |
| 2014/0201410 A1 | 7/2014 | Hartwich | |
| 2014/0223258 A1 * | 8/2014 | Hartwich | G06F 13/4282 714/758 |

OTHER PUBLICATIONS

Robert Bosch GMBH; CAN with Flexible Data-Rate; Apr. 17, 2012; 32 Pages; Version 1.0; Gerlingen, Germany.

* cited by examiner

METHOD FOR SERIALLY TRANSMITTING A FRAME FROM A TRANSMITTER TO AT LEAST ONE RECEIVER BY MEANS OF A BUS SYSTEM, AND A SUBSCRIBER STATION FOR A BUS SYSTEM

This application is a 35 U.S.C. § 371 National Stage Application of PCT/EP2015/067928, filed on Aug. 4, 2015, which claims the benefit of priority to Serial Nos. DE 10 2014 217 508.9 filed on Sep. 2, 2014 and DE 10 2015 209 207.0 filed on May 20, 2015, in Germany, the disclosures of which are incorporated herein by reference in their entirety.

BACKGROUND

A weakness has been found in CRC generation (CRC=Cyclic Redundancy Check) of the CAN FD frames or messages according to the current Committee Draft of ISO11898-1 or the specification "CAN with Flexible Data-Rate, Specification Version 1.0 (released Apr. 17, 2012)", which can be downloaded from the website http://www.semiconductors.bosch.com.

The weakness is to do with the CAN stuffing mechanism, which is described in the cited document. This involves inserting after five bits with the same level a "stuff bit", which has a different level than the five previous bits. By this predetermined rule for inserting the stuff bits it is possible to prevent that bit sequences with more than five identical bits are mistakenly interpreted as signaling an End of Frame, for example, or that the absence of signal edges or changes of level between the bits causes the bus subscribers to lose synchronization. This is so because, in the case of CAN and CAN FD, signal edges or changes of level are used for synchronizing the bus subscribers.

After an initial Start of Frame bit (SOF bit) with a dominant level, which signals the beginning of the frame, CAN FD messages or frames have a bit 28 to bit 18, and possibly also a bit 17 to bit 0, for an identifier of the CAN FD frame. Therefore, the bit 28 to bit 0 is also referred to as ID28, ID27, etc.

According to the known rule for inserting the stuff bits, a stuff bit is inserted into the CAN FD frame at the earliest after the bit ID25, that is to say when ID28-ID25="0000". If CAN FD frames beginning with ID28-ID25="0000" or ID28-ID25="0001" are sent, a Start of Frame bit erroneously detected by the receiver of the frame may have the effect that the identifier of the frame is falsified, but the CRC test does not detect this error. Since in the case of CAN FD stuff bits are included in the CRC generation, this error does not lead to a format error and is not detected. The frame is therefore accepted by the receiver as valid. Affected by this are 11-bit and 29-bit identifiers in the case of frames in the FD format (17-bit and 21-bit CRC).

The CRC weakness is caused by the initialization vector of the CRC generator. This is currently a zero vector "0 . . . 0". This weakness can be eliminated by changing the initialization vector to for example "10 . . . 0" (final value only after further investigations). The problem here is however that two CAN FD implementations that use the same CRC generator, but with different initialization vectors, cannot communicate with one another. They would continually detect CRC errors and reject the frames received.

Frames in the classical CAN format are not affected by the problem, since with them the stuff bits are excluded from the CRC calculation.

The weakness of the CAN FD CRC only manifests itself in the following two cases:

Case 1) Transmitter Sends ID28-ID25="0000"

The receiver does not detect the Start of Frame and therefore interprets ID28 as the Start of Frame. Consequently, on account of the stuff bit inserted by the transmitter after ID25, the first four identifier bits are falsified as ID28-ID25="0001"; all the subsequent identifier bits are received correctly. The transmitter does not detect any error when reading back the Start of Frame from the bus.

Case 2) Transmitter Sends ID28-ID25="0001"

The receiver sees a dominant bit in the bit time before the sent Start of Frame and interprets this disturbance as a Start of Frame. The receiver detects the Start of Frame sent by the transmitter as ID28. Consequently, the first four identifier bits are falsified as ID28-ID25="0000". The sent ID25="1" is interpreted by the receiver as a stuff bit. All the subsequent identifier bits are received correctly. The transmitter does not detect a dominant bit in the bit time directly before its Start of Frame.

To sum up, Table 1 shows how, as a result of the effect described, the leading four identifier bits can be falsified on the way to the receiver, without the error being detected by the CRC test of the receiver.

TABLE 1

| Sent | | | | | Received | | | |
|---|---|---|---|---|---|---|---|---|
| ID25 | ID27 | ID26 | ID25 | | ID25 | ID27 | ID26 | ID25 |
| 0 | 0 | 0 | 0 | → | 0 | 0 | 0 | 1 |
| 0 | 0 | 0 | 1 | → | 0 | 0 | 0 | 0 |

In all other cases, a falsified identifier is detected by the CRC with a Hamming distance of 6.

SUMMARY

Therefore, the object of the present disclosure is to provide a method for the serial transmission of a frame from a transmitter to at least one receiver via a bus system and a subscriber station for a bus system which method and which subscriber station solve the aforementioned problems. In particular, it is intended to provide a method for the serial transmission of a frame from a transmitter to at least one receiver via a bus system and a subscriber station for a bus system with which the reliability of the data transmission is further increased in comparison with previous methods.

The object is achieved by a method for the serial transmission of a frame from a transmitter to at least one receiver via a bus line with the features according to the disclosure. In the method, stuff bits are inserted into the frame by the transmitter according to a predetermined rule to generate additional signal edges and/or the stuff bits are removed again by the receiver in an evaluation of the frame, at least one item of information concerning a segment of the frame being additionally inserted and transmitted outside this segment, and the segment having a predetermined sequence of bit values.

Advantageous further refinements of the method are specified in the embodiments of the disclosure.

It is possible that the frame has a header part, a data, part and an end part and/or that the header part has an identifier and/or that the frame has a CRC checksum and/or that the segment has no stuff bit.

The information may with preference be transmitted in the data part and/or in the header part of the frame. As a result, no modifications to a controlling device of a subscriber station of the bus system are required.

The information may be transmitted at least partially in the RRS bit and/or in the res bit and/or in the "ESI" bit of a CAN FD frame and/or an additional checksum in the data part.

In the evaluation of the frame, the receiver may preferably compare the information concerning the segment of the frame stored outside the segment with the segment of the frame and, depending on the result of the comparison, assess the frame as valid or invalid.

The segment may possibly end with that bit after which at the earliest a stuff bit is inserted into the frame by the transmitter, and/or the segment of the frame may comprise four bits, of which the information can be transmitted in two bits outside this segment.

In a special refinement, the segment of the frame may comprise up to three bits, of which the information can be transmitted in a bit outside this segment, and/or the segment of the frame may comprise up to three bits with the same level, which may be directly preceded by a further bit with the same level outside the segment.

In a special refinement, the segment of the frame corresponds to the four first bits of the identifier of a CAN FD frame.

The previously stated object is also achieved by a subscriber station for a bus system according to the disclosure. The subscriber station comprises a transmitting/receiving device be designed for transmitting a frame to and/or receiving a frame from a further subscriber station of the bus system, with which frames can be transmitted from a transmitter to at least one receiver by means of serial transmission via a bus line, and comprises a verifying device for verifying an item of information concerning a segment of the frame, the transmitting/receiving device being designed so as, before sending a frame, to insert stuff bits into the frame according to a predetermined rule to generate additional signal edges and/or so as, when evaluating a received frame, to remove the stuff bits again, the verifying device being designed so as to additionally insert at least one item of information concerning a segment of the frame into the frame outside this segment, and the segment having a predetermined sequence of bit values.

The subscriber station may be part of a bus system, which also has a bus line and at least two subscriber stations, which can be connected to one another via the bus line in such a way that they can communicate with one another, at least one of the at least two subscriber stations being the subscriber station described above.

Further possible implementations of the disclosure also comprise not explicitly mentioned combinations of features or embodiments that are described above or below with respect to the exemplary embodiments. At the same time, a person skilled in the art will also add individual aspects as improvements or supplements to the respective basic form of the disclosure.

BRIEF DESCRIPTION OF THE DRAWINGS

The disclosure is described in more detail below on the basis of exemplary embodiments and with reference to the accompanying drawing, in which.

Unless otherwise stated, in the figures elements that are the same or functionally the same are provided with the same reference signs.

DETAILED DESCRIPTION

Figure 1:
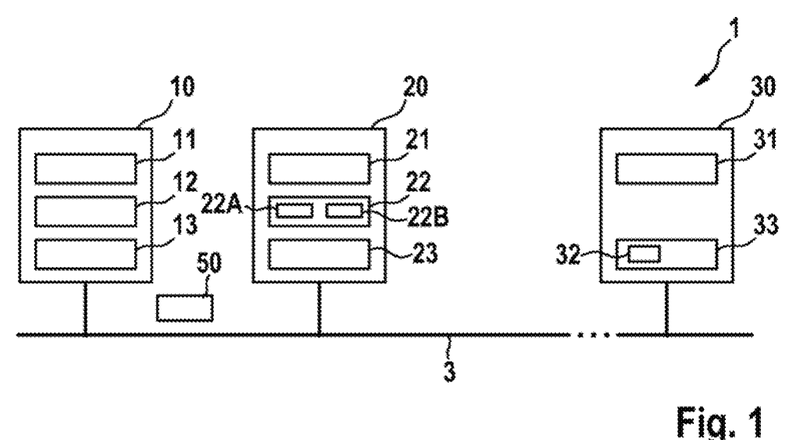
FIG. 1 shows a simplified block diagram of a bus system according to a first exemplary embodiment.

FIG. 1 shows in a first exemplary embodiment a bus system 1, which may for example be a CAN FD bus system. The bus system 1 may be used in a vehicle, in particular a motor vehicle, an aircraft, etc., or in the industrial sector, for example in control installations etc., or in a hospital.

In FIG. 1, the bus system 1 has a bus line 3, to which a multiplicity of subscriber stations 10, 20, 30 are connected. Via the bus line 3, frames 50 can be transmitted in the form of signals between the individual subscriber stations 10, 20, 30, The subscriber stations 10, 20, 30 may be for example control devices, sensors, display devices, etc. of a motor vehicle.

As shown in FIG. 1, the subscriber station 10 has a communication control device 11, a verifying device 12 and a transmitting/receiving device 13. It goes without saying that the verifying device 12 may also be part of the communication control device 11. By contrast, the subscriber station 20 has a communication control device 21, a verifying device 22 with an insertion unit 22A and an evaluation unit 223, and a transmitting/receiving device 23. The subscriber station 30 has a communication control device 31, a verifying device 32 and a transmitting/receiving device 33, which has the verifying device 32. The transmitting/receiving devices 13, 23, 33 of the subscriber stations 10, 20, 30 are respectively connected directly to the bus line 3, even if this is not represented in FIG. 1.

The communication control devices 11, 21, 31 respectively serve for controlling a communication of the respective subscriber station 10, 20, 30 via the bus line 3 with another subscriber station of the subscriber stations 10, 20, 30 connected to the bus line 3. The communication control devices 11, 21, 31 may be respectively configured like a conventional CAN FD controller. The communication control devices 11, 21, 31 may also be respectively formed as part of a microcontroller, which is likewise comprised by the respective subscriber station 10, 20, 30.

The transmitting/receiving devices 13, 23, 33 may be respectively configured like a conventional CAN FD transceiver.

The verifying devices 12, 22, 32 may also be configured as software modules, which form part of the software running on the subscriber station. In this case, the method according to the present disclosure is fully implemented in software.

The first exemplary embodiment describes a method for verifying CAN FD frames with identifiers in a way corresponding to the aforementioned cases 1) and 2), The method is respectively carried out with the verifying devices 12, 22, 32.

Figure 2:
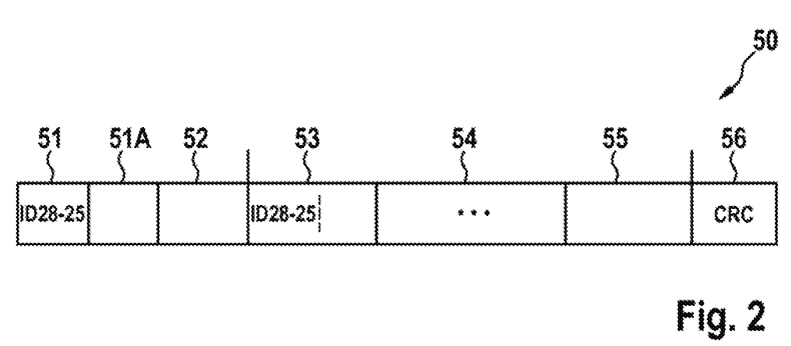
FIG. 2 shows a representation of a structure of a frame in the case of the bus system according to the first exemplary embodiment.

FIG. 2 shows very schematically the structure of a CAN FD frame 50 without the Start of Frame bit (SAF), which is transmitted directly before the frame 50 via the bus line 3. The frame 50 has a header part 51, 51A, 52, a data field 53, 54, 55, and also an end part 56, which forms the end of the frame. The header part 51, 51A, 52 has in a first segment 51 the first four bits of the identifier (ID) 51, 51A, in a second segment 51A the remaining bits of the identifier 51, 51A and a control field 52. The data field 53, 54, 55 has in a first part 53 a byte 0, in a second part 54 further bytes and in a third part 55 a byte n.

Shown in FIG. 2 is one of many possible placements of the first segment 51, which has the first four identifier bits (ID28-ID25) to be checked, in the data field 53, 54, 55. To be more precise, in FIG. 2 the first four identifier bits (ID28-ID25) to be checked are arranged in the first part 53 of the data part 53, 54, 55, that is to say the byte 0. The end part 56 or the end of the frame of the CAN FD frame 50 contains the CRC.

In the method according to the present exemplary embodiment, the verification is performed quite generally by inserting the first four bits of the identifier into the data field 53, 54, 55 of the CAN FD frame. This method does not require any modifications to existing CAN FD controllers, such as the communication control devices 11, 21, 31.

In order that a receiver, for example the subscriber station 10, can detect whether the identifier 51, 51A of a received CAN FD frame 50 has been falsified by an erroneously sampled Start of Frame bit, a copy of the first four bits of the identifier ID28-ID25 (segment 51) affected by this effect is stored in the data field 53, 54, 55 of the CAN FD frame by the transmitter, for example the subscriber station 30, to be more precise its verifying device 32. The receiver, that is to say in the case of the example mentioned the subscriber station 10, then compares with the aid of its verifying device 12, 22, 32 the four identifier bits from the data field 53, 54, 55 with the identifier bits ID28-ID25 51 received by it. If they do not match, the frame 50 is rejected.

If the subscriber station 20 is a transmitter, the copy of the first four bits of the identifier ID28-1125 (segment 51) affected by this effect is stored by the insertion unit 22A of the verifying device 22 in the data field 53, 54, 55 of the CAN FD frame 50, for example in the byte 0, as shown in FIG. 2. If the subscriber station 20 is a receiver, the evaluation unit 22B of the verifying device 22 compares the four identifier bits from the data field 53, 54, 55 with the identifier bits ID28-ID25 51 received by the subscriber station 20.

In respect of the weakness of the CAN FD CRC tests, only two cases are relevant, as presented in the previously shown Table 1. In all other cases, the falsified identifier 51, 51A is reliably detected by the CRC.

The four identifier bits ID28 to ID25 shown in Tables 1 and 2, the segment 51, may therefore be stored in the upper four bits of the first data byte in the data field 53, 54, 35 of the CAN FD frame 50, as shown in FIG. 2. They may, however, also be stored in any desired place in the data field 53, 54, 55.

The described method may be carried out for each identifier 51, 51A. Alternatively, it is however also possible that the verifying device 22 only carries out the described verification if the identifier 51, 51A begins with the two critical combinations "0000" and "0001", that is to say a predetermined sequence of hit values for a segment 51 of the CAN FD frame 50.

The first four identifier bits (ID28-1D25) stored in the data field 53, 54, 55 of the CAN FD frame 50 as segment 51 allows an identifier 51, 51A that has been changed by a falsified Start of Frame bit to be reliably detected. Consequently, the gap created by the CRC weakness can be closed. Quite generally, the segment 51, which is stored in the data field 53, 54, 55 of the CAN FD frame 50, can end with the bit after which at the earliest a stuff bit is inserted into the frame (50; 60; 70; 600; 700) by the transmitter.

The method has the advantage that no hardware modification to the CAN FD controllers 11, 21, 31 is necessary. This means that the initialization vector for the CRC generator does not have to be modified, Consequently, two incompatible hardware versions are avoided.

According to a modification of the first exemplary embodiment, alternatively a coding in the data field 53, 54, 55 with two bits F1 and F2 for the segment 51 would also be possible. Bit F1 is set to zero if the identifier bits ID28-ID26 are zero, otherwise the bit F1 has the value one. Bit F2 indicates the value of ID25. This is shown as an overview in the following Table 2.

TABLE 2

| Identifier | | | | Coding of data field | |
|---|---|---|---|---|---|
| ID25 | ID27 | ID26 | ID25 | F1 | F2 |
| 0 | 0 | 0 | 0 | 0 | 0 |
| 0 | 0 | 0 | 1 | 0 | 1 |
| other IDs | | | 0/1 | 1 | 0/1 |

In this way, a verification of the identifier bits ID28-ID25 can be achieved with less memory requirement in the data field 53 to 55 than in the case of the first exemplary embodiment.

A further possibility for a modification of the first exemplary embodiment would be that, for the case where the identifier 51, 51A of the frame 50 to he sent begins with the critical combinations "0000" and "0001", the transmitter increases by one the data length code (DLC) in accordance with ISO 11898-1 in the control field 52, and then stores the four identifier bits ID28-ID25, the segment 51, or the two bits F1 and F2 for the four identifier bits ID28-ID25, in an unused byte of the thereby increased data field 53, 54, 55. This would have the advantage that the division of the data bytes of the data field 53, 54, 55 among the payload data can remain unchanged. The data length code DLC in the control field 52 is shown in FIG. 3 to FIG. 6 for the second exemplary embodiment.

Yet a further alternative for a modification of the first exemplary embodiment exploits the fact that the payload data in the data field 53, 54, 55 are often verified by an additional checksum, such as for example the Message Authentication Code. This checksum is transmitted together with the payload data in the data field 53, 54, 55, for example in the third part 55 for the byte n or at some other place in the data field. If the identifier bits ID28-ID25, the segment 51, are then also included in the checksum calculation, the receiver, to be more precise its verifying device 22 or evaluation unit 223, can detect the falsified identifier bits 51 by means of this second checksum.

The use of the described method can be demonstrated by the behavior of the subscriber stations 10, 20, 30 with communication control devices 11, 21, 31 and verifying devices 12, 22, 32.

Second Exemplary Embodiment

In the case of this exemplary embodiment, the bus system 1 is configured in large parts in the same way as described above with reference to the first exemplary embodiment. As a difference from the first exemplary embodiment, the present exemplary embodiment describes a method for verifying CAN FD frames with identifiers in a way corresponding to case 1) and 2) by additional transmission of an item of information, for example a checksum, concerning the content of the first four bits of the identifier at a different place within the CAN FD frame than in the case of the first exemplary embodiment and modifications thereof mentioned.

The additional transmission of an item of information, for example a checksum, concerning the content of the first four bits of the identifier makes a detection of the error cases previously described with reference to Table 1 possible.

This has the advantage that, as a result, the gap in error detection created by the CRC weakness can be closed. The frame or message formats of the CAN and CAN FD frames or messages remain unchanged; there is merely a corresponding item of information written into a control bit.

Figure 3:
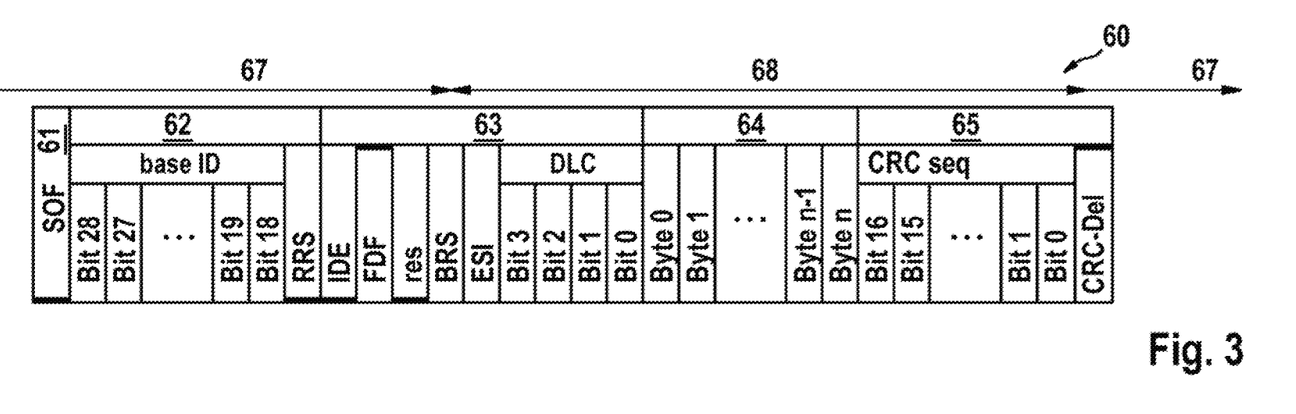
FIG. 3 to FIG. 6 respectively show with respect to a second exemplary embodiment the format of CAN FD frames with the placement of the first four identifier bits (ID28-ID25) to be checked and of the check bit RRS.

FIG. 3 shows a frame 60 sent by one of the subscriber stations 10, 20, 30 with up to 16 data bytes in the CAN FD base format. The frame 60 has an SOF bit 61 and also a number of frame fields, such as an arbitration field 62, a control field 63, a data field 64 and a checksum field 65 (CRC field). The arbitration field 62 comprises in the base ID field an identifier of the frame 60. Arranged at the end of the arbitration field 62 is an RRS bit. The control field 63 begins with an IDE bit, which is followed by an FDF bit and then by a res bet and a then-following ERS bit and then an ESI bit, which is followed by a DLC field. The data field 64 is not present if the DLC field of the control field 63 has the value 0. The checksum field 65 contains in a CRC-seq field a CRC checksum and ends with a then-following CRC delimiter CRC-Del. The fields and bits mentioned are known from ISO-CD-11898-1, and are therefore not described in more detail here.

In FIG. 3, the length of an arbitration phase 67 in the case of the present exemplary embodiment is indicated. The arbitration phase 67 is followed by the data phase 68 if the ERS bit in the frame 60 is recessive. The frame 60 has a header part 61 to 63, a data part 64 and an end part 65.

In FIG. 3 to FIG. 6, dominant bits are represented by a broad line at the lower edge of the frame 60. Recessive bits are represented in FIG. 3 to FIG. 6 by a broad line at the upper edge of the frame 60.

As shown in FIG. 3, the associated communication control device 11, 21, 31 of the transmitter has created the frame 60 in such a way that the SOF bit, the RRS bit, the IDE bit and the res bit are dominant, whereas the FDF bit and the CRC delimiter CRC-Del are recessive.

Figure 4:
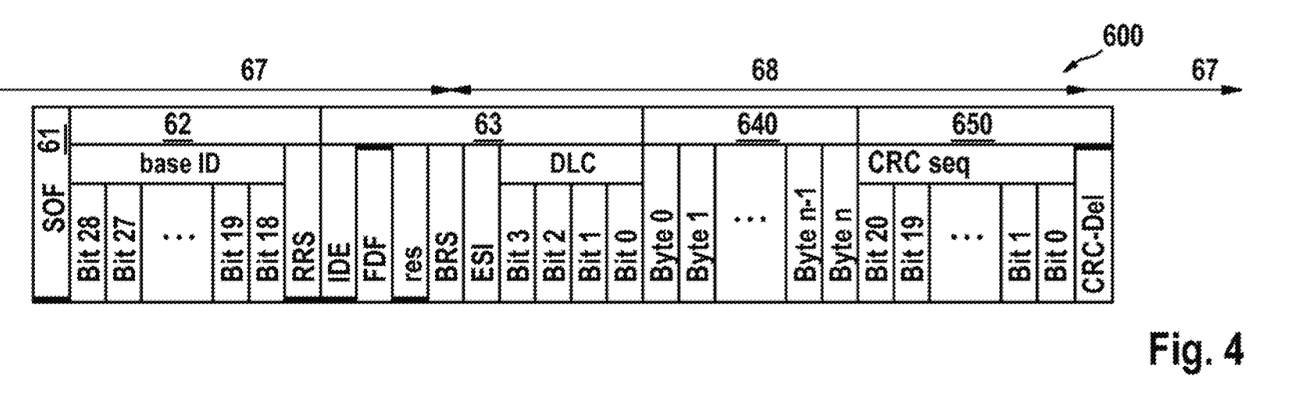

FIG. 4 shows a frame 600 sent by one of the subscriber stations 10, 20, 30, with more than 16 data bytes in the CAN FD base format. The frame 600 is constructed in the same way as the frame 60 from FIG. 3 apart from a longer data field 640 in comparison with the data field 64 and a longer checksum field 650 in comparison with the checksum field 65. The frame 600 has a header part 61 to 63, a data part 640 and an end part 650.

Figure 5:
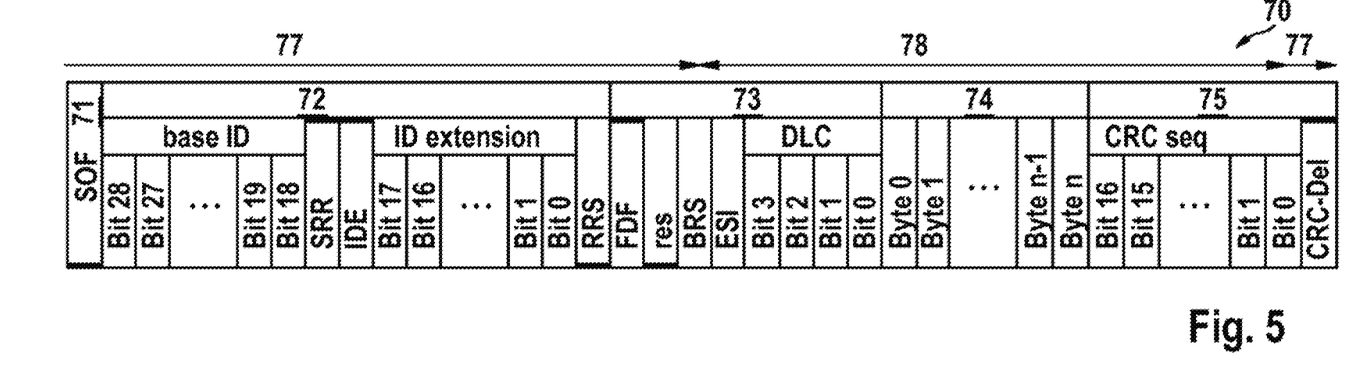

FIG. 5 shows a frame 70 sent by one of the subscriber stations 10, 20, 30, with up to 16 data bytes in the CAN FD extended format. According to FIG. 5, the frame 70 has an SOF bit 71 and also a number of frame fields, such as an arbitration field 72, a control field 73, a data field 74 and a checksum field 75 (CRC field). The arbitration field 72 comprises in the base-ID field and the ID-ext field an identifier of the frame 70. Provided between the base-ID field and the ID-ext field are an SER bit and an IDE bit. Arranged at the end of the arbitration field 72 is an RES bit. The control field 73 begins with an FDF bit, followed by a res bit. There then follows a ERS bit and an ESI bit. The control field 73 ends with the DLC field. The data field 74 is not present if the DLC field of the control field 73 has the value 0. Otherwise, the frame 70 is constructed in the same way as the frame 60 from FIG. 3 and has a corresponding arbitration phase 77 and data phase 78. The frame 70 has a header part 71 to 73, a data part 74 and an end part 75.

As shown in FIG. 5, the associated communication control device 11, 21, 31 of the transmitter has created the frame 70 in such a way that the SOF bit, the RES bit and the res bit are dominant, whereas the SEE bit, the IDE bit and the CRC delimiter CRC-Del are recessive.

Figure 6:
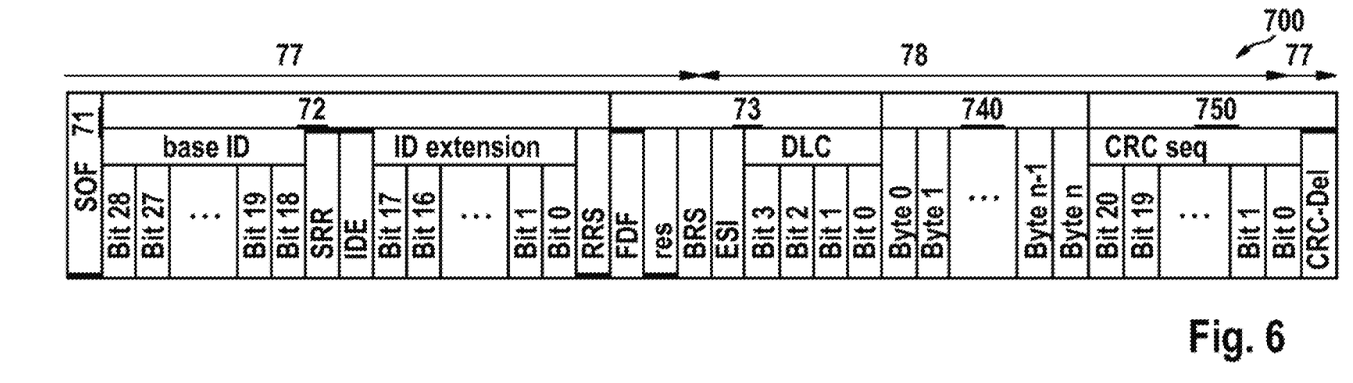

FIG. 6 shows a frame 700 sent by one of the subscriber stations 10, 20, 30, with more than 16 data bytes in the CAN FD extended format. The frame 700 is constructed in the same way as the frame 70 from FIG. 5 apart from a longer data field 740 in comparison with the data field 74 and a longer checksum field 750 in comparison with the checksum field 75, The frame 700 has a header part 71 to 73, a data part 740 and an end part 750.

In order that a receiver, for example the subscriber station 20, can detect whether the identifier 62, 72 of a received CAN FD frame 60, 70, 600, 700 has been falsified by an erroneously sampled Start of Frame bit 61, 71, in the case of the affected messages or frames 60, 70, 600, 700 an item of information concerning the content of the first four bits ID28-ID25 of the identifier 62, 72 affected by this effect is stored as a segment of the frame 60, 70, 600, 700 in a bit outside the data field 64, 74, 640, 740, for example in the RRS bit of the CAN FD frame 60, 70, 600, 700, by the transmitter, for example the subscriber station 10. This item of information is for example RRS=1 for 0001 and RRS=0 for 0000. In all other cases, the RRS bit is transmitted dominant, as previously provided, as shown in FIG. 3 to FIG. 6.

Quite generally, here too the segment of which the information is stored in a bit outside the data field 64, 74, 640, 740 can end with the bit after which at the earliest a stuff bit is inserted into the frame 60, 70, 600, 700 by the transmitter.

In a modification of the second exemplary embodiment, the item of information for the RRS bit is provided as RRS=0 if the first four bits 28 to 25 of the identifier 62, 72, in other words ID28-ID25, as a segment of the frame 60, 70, 600, 700, have a value of 0001, and RRS=1 if the first four bits 28-25 of the identifier 62, 72 have a value of 0000.

To check that the first four bits of the identifier 62, have been received correctly, the receiver first tests or checks in a corresponding method whether, in the data frame 60, 70, 600, 700 received by it, there is for the identifier 62, 72=000 for (ID28, ID27, ID26), where (ID28, ID27, ID26) corresponds to the bits 28 to 26 in base ID.

If this test or check finds that (ID28, ID27, ID26) is unequal to 000, no further test is performed.

If, however, the test or check finds that (ID28, ID27, ID26) is equal to 000, the receiver compares the content of bit 25 of the identifier 62, 72, that is to say ID25, with the content of the RRS bit in the data frame 60, 70, 600, 700 received by the receiver.

If they do not match, the received frame 60, 70, 600, 700 is rejected or assessed as valid, i.e. the receiver sends an error flag.

If they do match, the frame 60, 70, 600, 700 is not rejected and is assessed as valid.

In the case of the aforementioned modification of the second exemplary embodiment, the two aforementioned measures that are provided for no match and a match are correspondingly reversed. That is to say that, if there is a match, the received frame 60, 70, 600, 700 is rejected, i.e. the receiver sends an error flag. And if there is no match, the frame 60, 70, 600, 700 is not rejected.

In a further modification of the second exemplary embodiment, the still remaining or unoccupied "res" bit and/or the "ESI" bit is/are additionally employed and F1 and F2 are used. These bits have been described more precisely above with reference to the first exemplary embodiment and the modifications thereof.

It is however also possible to insert after the ESI hit one or more additional bits for the transmission of the information, for example F1 and F2.

The RRS bit is transmitted in CAN FD frames 60, 70, 600, 700 at the same position at which the RTR bit is transmitted in classical CAN frames.

The working version of the ISO standard relating to CAN FD (ISO 11898-1) provides that RRS bits are only provided in CAN FD frames 60, 70, 600, 700, it being intended that the RRS bit should be transmitted in CAN FD frames 60, 70, 600, 700 at the position of the RTR bit in classical CAN frames and that the RRS bit should be transmitted dominant, but receivers should accept recessive and dominant RES bits. ("ERS bit [only in FD Frames] The RRS bit shall be transmitted in FD Frames at the position of the RTR bit in Classical Frames. The RRS bit shall be transmitted dominant, but receivers shall accept recessive and dominant RRS bits."

Since at the time of the transmission of the RRS bit it has not yet been established for the receiver whether the received frame 60, 70, 600, 700 or, of the received frame is a classical CAN or a CAN FD frame 60, 70, 600, 700 or message, the evaluation can only be carried out after transmission of two further bits (IDE bit and FDF bit) for Basic Format (frames 60, 600) or a further bit (FDF bit) for Extended Format (frames 70, 700).

The RTR or RRS bit is included in considerations in the arbitration for bus access. This does not lead to problems, however, because: if the transmission of two frames is started simultaneously by two different subscribers, one frame, for example a frame 60, beginning with 0000 and having RRS=0, and the other frame, for example a frame 700, beginning with 0001 and having RRS=1, the first transmitter wins the arbitration (assuming that the transmitters are functioning correctly) and the value of the RRS bit plays no part in the arbitration.

The use of the described method can be demonstrated by the behavior of the subscriber stations 10, 20, 30 with communication control devices 11, 21, 31 and verifying devices 12, 22, 32.

All of the refinements described above of the bus system 1, the subscriber stations 10, 20, 30 and the method may be used individually or in all possible combinations. In particular, all of the features of the previously described exemplary embodiments and/or the modifications thereof may be combined as desired or be omitted. In addition, the following modifications are conceivable in particular.

The bus system 1 according to the exemplary embodiments that is described above is described on the basis of a bus system based on the CAN FD protocol. The bus system 1 according to the exemplary embodiments may however also be another kind of communication network. It is advantageous, but not an absolute prerequisite, that with the bus system 1 exclusive, collision-free access of a subscriber station 10, 20, 30 to a common channel is ensured, at least for certain time periods.

There may be any desired number and arrangement of the subscriber stations 10 to 30 in the bus system 1 of the exemplary embodiments and modifications thereof. In particular, there may also only be subscriber stations 10 or 20 or 30 in the bus system 1. Any desired combinations of the subscriber stations 10 to 30 in the bus systems 1 are possible.

The segment 51, 62, 72 of the frame 50, 60, 70, 600, 700 does not necessarily have to have the four first bits of the identifier of a CAN FD frame. The segment may also contain some other predetermined sequence of bit values. The predetermined sequence may have at least two bits.

The invention claimed is:

1. A method for serial transmission of a frame, the method comprising:
   transmitting the frame from a transmitter to a receiver via a bus line;
   inserting, before the transmitting, stuff bits into the frame with the transmitter according to a predetermined rule to generate additional signal edges;
   removing, after the transmitting, the stuff bits with the receiver in an evaluation of the frame; and
   inserting into the frame at least one item of information concerning a segment of the frame, the segment having a predetermined sequence of bit values, the at least one item of information being inserted outside the segment of the frame,
   wherein the segment ends before a first stuff bit is inserted into the frame by the transmitter.

2. The method as claimed in claim 1, wherein the frame includes a header part, a data part, and an end part.

3. The method as claimed in claim 2, further comprising:
   transmitting the at least one item of information in one of the data part and the header part of the frame.

4. The method as claimed in claim 1, further comprising:
   transmitting the at least one item of information at least partially in at least one of (i) an RRS bit, (ii) a res bit, (iii) a "ESI" bit of a CAN FD frame, and (iv) an additional checksum in a data part.

5. The method as claimed in claim 1, further comprising:
   comparing, with the receiver, in the evaluation of the frame, the at least one item of information concerning the segment of the frame with the segment of the frame; and
   assessing, depending on a result of the comparison, whether the frame is valid.

6. The method as claimed in claim 1, wherein the segment of the frame comprises four bits and the at least one item of information is inserted in two bits outside the segment.

7. The method as claimed in claim 1, wherein:
   the segment of the frame comprises up to three bits and the at least one item of information is inserted in a bit outside the segment.

8. The method as claimed in claim 1, wherein the segment of the frame is four first bits of an identifier of a CAN FD frame.

9. A subscriber station for a bus system, the subscriber station comprising: a transmitting/receiving device configured to (i) transmit a frame and (ii) receive the frame from a further subscriber station of the bus system via a bus line; and
   a controller including a processor and a memory, the memory including programmed instructions for execution by the processor, the programmed instructions including instructions for causing the controller to implement a method of verifying at least one item of information concerning a segment of the frame, the method comprising:
   causing the transmitting/receiving device to transmit the frame from a transmitter to a receiver via a bus line;
   before transmitting the frame, inserting stuff bits into the frame according to a predetermined rule to generate additional signal edges, and inserting into the frame at least one item of information concerning a segment of the frame, the segment having a predetermined sequence of bit values, the at least one item of information being inserted outside the segment of the frame, wherein the segment ends before a first stuff bit is inserted into the frame by the transmitter.

10. A bus system comprising:

a bus line; and at least two subscriber stations configured to be connected to one another via the bus line such that they can communicate with one another, at least one of the at least two subscriber stations comprising:

a transmitting/receiving device configured to (i) transmit a frame to and (ii) receive the frame from a further subscriber station of the at least two subscriber stations via the bus line; and a controller including a processor and a memory, the memory including programmed instructions for execution by the processor, the programmed instructions including instructions for causing the controller to implement a method of verifying at least one item of information concerning a segment of the frame, the method comprising:

causing the transmitting/receiving device to transmit the frame from a transmitter to a receiver via a bus line;

before transmitting the frame, inserting stuff bits into the frame according to a predetermined rule to generate additional signal edges, and inserting into the frame at least one item of information concerning a segment of the frame, the segment having a predetermined sequence of bit values, the at least one item of information being inserted outside the segment of the frame, wherein the segment ends before a first stuff bit is inserted into the frame by the transmitter.

* * * * *

UNITED STATES PATENT AND TRADEMARK OFFICE
CERTIFICATE OF CORRECTION

PATENT NO. : 10,567,109 B2
APPLICATION NO. : 15/508242
DATED : February 18, 2020
INVENTOR(S) : Martin Heinebrodt et al.

Page 1 of 1

It is certified that error appears in the above-identified patent and that said Letters Patent is hereby corrected as shown below:

In the Claims

In Claim 10, at Column 11, Line 17, delete the word "to" between the words "frame" and "and".

Signed and Sealed this
Twelfth Day of May, 2020

Andrei Iancu
*Director of the United States Patent and Trademark Office*